H. H. GOETTER AND J. TRUPKE.
JACK.
APPLICATION FILED AUG. 25, 1915.
1,309,755.
Patented July 15, 1919.
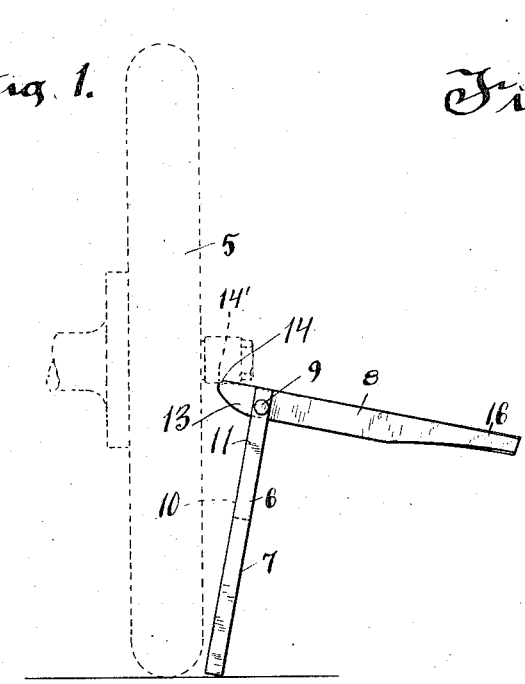
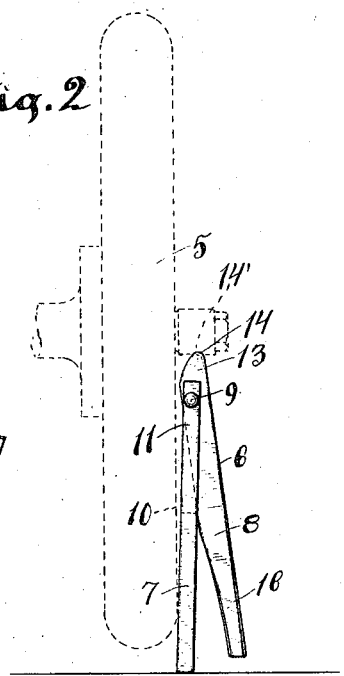
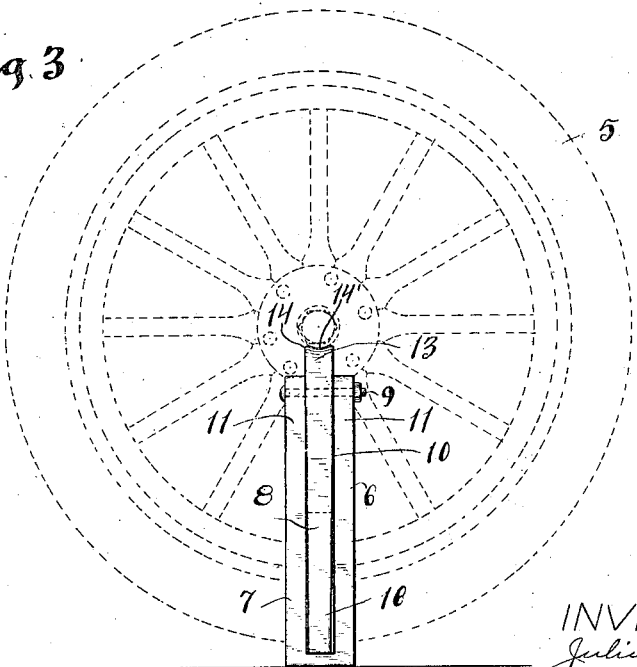
INVENTOR
Julius Trupke
Herman H. Goetter.
By Morsell, Keeney & French.
ATTORNEYS

UNITED STATES PATENT OFFICE.

HERMAN H. GOETTER AND JULIUS TRUPKE, OF MILWAUKEE, WISCONSIN.

JACK.

1,309,755.　　　　　Specification of Letters Patent.　　Patented July 15, 1919.

Application filed August 25, 1915. Serial No. 47,275.

*To all whom it may concern:*

Be it know that we, HERMAN H. GOETTER and JULIUS TRUPKE, citizens of the United States and residents of Milwaukee, in the county of Milwaukee and State of Wisconsin, have invented new and useful Improvements in Jacks, of which the following is a description, reference being had to the accompanying drawings, which are a part of this specification.

This invention relates to improvements in jacks more particularly adapted for automobile use.

In automobiles and other vehicles provided with pneumatic tires the life of each tire is prolonged by relieving said tires of the strain of the weight of the machine during periods of non-use. Devices for accomplishing this result are now on the market but as four of the devices are required for each machine and as they are comparatively complicated and expensive to manufacture they have not come into general use.

It is one of the objects of the present invention to overcome the before mentioned objectionable features and provide a device in the form of a jack which is of very simple construction and may be manufactured and sold at a minimum cost.

A further object of the invention is to provide a jack which will automatically lock when holding an automobile wheel in raised position.

A further object of the invention is to provide a jack which may be used in connection with automobile wheels of different diameters.

With the above and other objects in view the invention consists of the improved jack and its parts and combinations as set forth in the claim, and all equivalents thereof.

In the accompanying drawing in which the same reference characters indicate the same parts in all of the views:

Figure 1 is a side view of the improved jack shown in engagement with an automobile wheel and before raising and supporting said wheel upon the jack;

Fig. 2 is a similar view thereof with the jack shown in wheel supporting position; and Fig. 3 is a front view taken at right angles from Fig. 2.

Referring to the drawing the numeral 5 indicates an automobile wheel and 6 the improved jack in engagement therewith. The jack is preferably formed of wood and comprises the body portion 7, the operating lever 8 and the fulcrum bolt 9. The body portion 7 is of elongated rectangular form and is provided with a slot or cutaway portion 10 to form an upper bifurcated end the arms 11 of which are approximately half the length of the body portion. The operating lever 8 is of the first class and is fulcrumed between and to the upper ends of the arms 11 by the bolt 9. A nut 12 threaded on the bolt serves to hold the parts together.

The outer end of the short arm 13 of the operating lever is slightly rounded off toward its upper outer edge 14 and grooved as indicated by the numeral 14, to position the end outwardly beyond the fulcrum bolt and to fit the hub 15 of the automobile wheel, and the opposite or longer arm 16 is rounded off to provide a handle for the operator.

In use the lower end of the body portion is placed adjacent to the portion of the tire resting upon the support with the operating lever swung in its upper position and with the short arm of the lever beneath the hub of the wheel as shown in Fig. 1. The long arm is now swung downwardly and in swinging downwardly to lift the wheel from the support the upper end of the body portion of the jack will be swung inwardly toward the wheel to a position where the fulcrum bolt will be out of alinement, inwardly, of a line drawn from the lower end of the body portion to the point of contact of the lever with the wheel hub. This positioning of the parts as well as the weight of the long arm of the lever locks the wheel in its upper position. In use one of the jacks is used for each wheel. As the wheel is raised several inches from the support the jack is automatically adapted to engage wheels of different diameters.

From the foregoing description it will be seen that the jack is of very simple construction and is well adapted for the purpose desired.

What we claim as our invention is:

A jack, comprising, a one-piece body member of elongated rectangular form and provided with a cutaway portion extending through approximately half the length thereof to form an upper bifurcated end defining a pair of spaced upper arms, said arms having alined openings near their upper ends, a fulcrum bolt engaging said openings and connecting said arms to brace the same, a lever member provided with an aperture at a point near one end of the lever and adjacent the lower edge thereof, the upper short end of the lever being curved from one edge to the other edge and the upper short end of said lever being grooved, the position of the bolt with relation to the grooved end permitting said grooved end to swing upwardly and outwardly beyond an imaginary line drawn vertically through the axis of the bolt and said body member to swing inwardly toward and impinge against the part being raised when the long arm of the lever is moved to its lower position to automatically lock the parts in adjusted position, substantially as described.

In testimony whereof, we affix our signatures.

HERMAN H. GOETTER.
JULIUS TRUPKE.

Witnesses:
MARIE GRAY,
FLORENCE M. BONCHARD.

Copies of this patent may be obtained for five cents each, by addressing the "Commissioner of Patents, Washington, D. C."